United States Patent [19]

Dullien

[11] Patent Number: 5,626,651
[45] Date of Patent: May 6, 1997

[54] METHOD AND APPARATUS FOR REMOVING SUSPENDED FINE PARTICLES FROM GASES AND LIQUIDS

[75] Inventor: Francis A. L. Dullien, 36, Stoke Drive, Kitchener, Ontario, Canada, N2N 1Z4

[73] Assignees: Francis A. L. Dullien, Ontario, Canada; Institut Francais du Petrole, Rueil-Malmaison, France

[21] Appl. No.: 638,577

[22] Filed: Apr. 29, 1996

Related U.S. Application Data

[63] Continuation of Ser. No. 290,883, Sep. 13, 1994, abandoned.

[30] Foreign Application Priority Data

Feb. 18, 1992 [GB] United Kingdom ............... 92/03437

[51] Int. Cl.⁶ .................................................. B01D 45/00
[52] U.S. Cl. ..................... 95/214; 55/257.2; 55/257.3; 55/259; 55/278; 55/308; 55/322; 55/326; 55/442; 95/268; 95/273; 96/190
[58] Field of Search ................... 55/257.1, 257.2, 55/257.3, 257.5, 259, 278, 308, 320, 322, 325, 326, 329, 442; 95/262, 267, 268, 273, 214; 96/190, 215

[56] References Cited

U.S. PATENT DOCUMENTS

| | | | |
|---|---|---|---|
| 672,299 | 4/1901 | Thompson | 55/442 |
| 885,185 | 4/1908 | Serrell | 55/257.3 |
| 936,377 | 10/1909 | Smith et al. | 55/442 |
| 1,434,090 | 10/1922 | Christensen | 55/278 |
| 1,562,352 | 11/1925 | Lundquist | 55/442 |
| 1,743,050 | 1/1930 | Straus | 55/278 |
| 2,448,424 | 8/1948 | Dohrmann | 55/442 |
| 2,457,292 | 12/1948 | Williams | 55/442 |
| 3,204,349 | 9/1965 | Kaufmann et al. | 55/442 |
| 4,113,569 | 9/1978 | Mahar | 55/257.2 |
| 4,247,312 | 1/1981 | Thakur et al. | 95/215 |

FOREIGN PATENT DOCUMENTS

| | | | |
|---|---|---|---|
| 0101555 | 2/1984 | European Pat. Off. | |
| 0379032 | 7/1990 | European Pat. Off. | |
| 518533 | 5/1921 | France. | |
| 55653 | 9/1952 | France | 55/442 |
| 313201 | 6/1919 | Germany | 96/215 |
| 314161 | 9/1919 | Germany | 55/442 |
| 341221 | 9/1921 | Germany | 55/442 |
| 921784 | 12/1954 | Germany. | |
| 3731766 | 3/1989 | Germany. | |
| 13630 | 6/1910 | United Kingdom | 55/325 |
| 237326 | 7/1925 | United Kingdom. | |
| 0457784 | 12/1936 | United Kingdom. | |
| 0564599 | 10/1944 | United Kingdom. | |
| 0604826 | 12/1948 | United Kingdom. | |
| 878037 | 9/1961 | United Kingdom. | |
| 1564710 | 4/1980 | United Kingdom. | |
| 9315822 | 8/1993 | WIPO. | |

*Primary Examiner*—C. Scott Bushey
*Attorney, Agent, or Firm*—Antonelli, Terry, Stout & Kraus, LLP

[57] ABSTRACT

A method of removing particulates from a gas stream involves introducing the gas stream in a turbulent flow condition into and through a flow passage situated over spaced surfaces defining a plurality of stagnant, turbulent-free regions of gas in which there is no net gas flow and which communicate with said gas stream and arranging the stagnant regions near the flow passage so that turbulent eddies of said gas stream carrying suspended particulates penetrate spaces between the surfaces and then decay in said stagnant regions defined therebetween where said particulates are trapped and deposited mechanically on said surfaces within each of said regions. The deposits accumulate at bottoms of the regions and can be periodically removed.

17 Claims, 2 Drawing Sheets

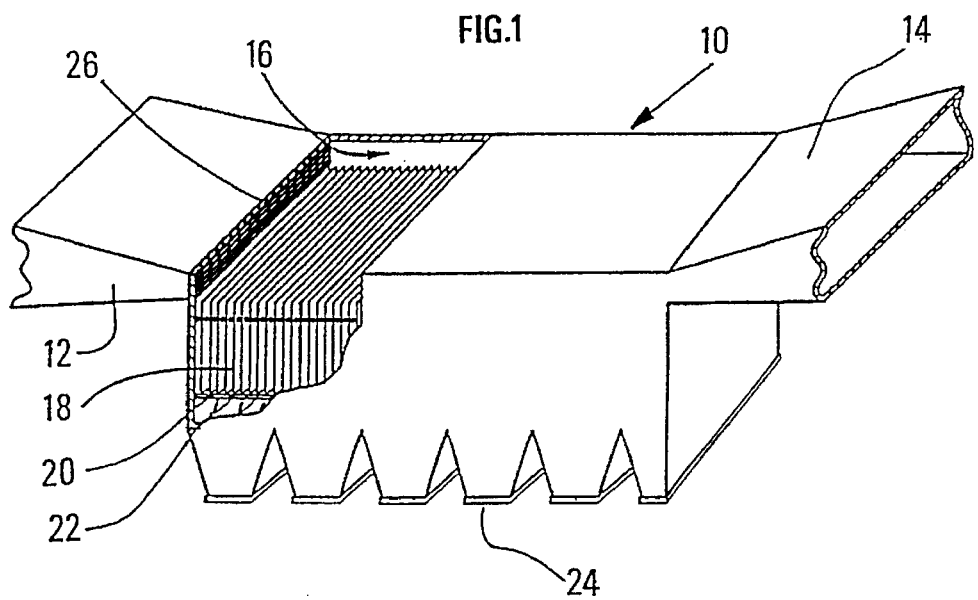
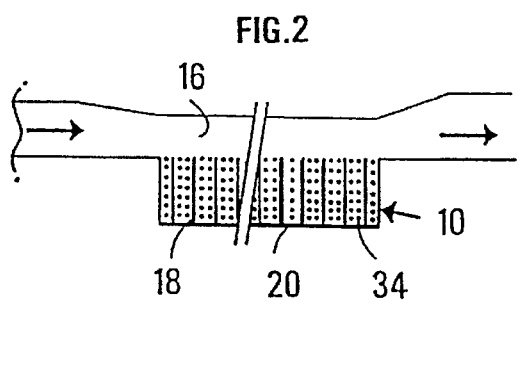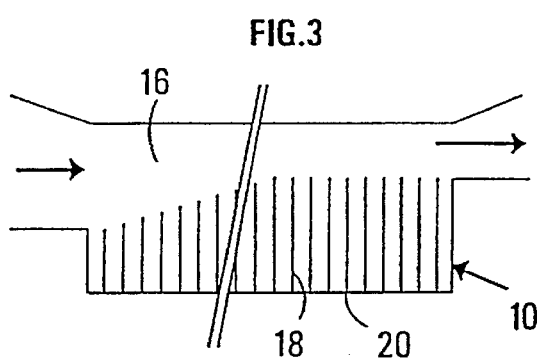
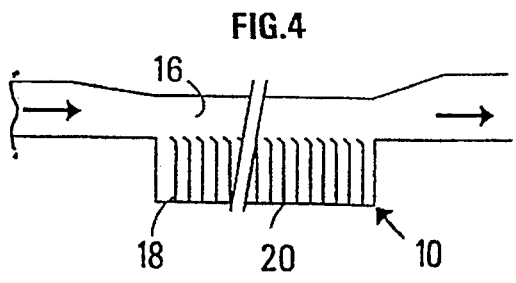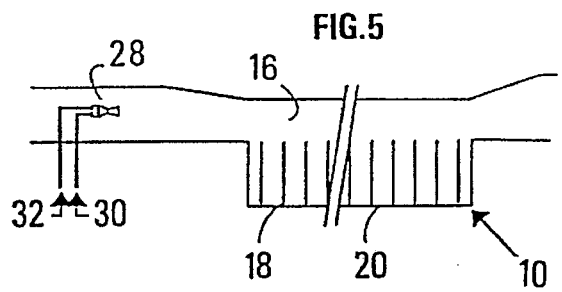

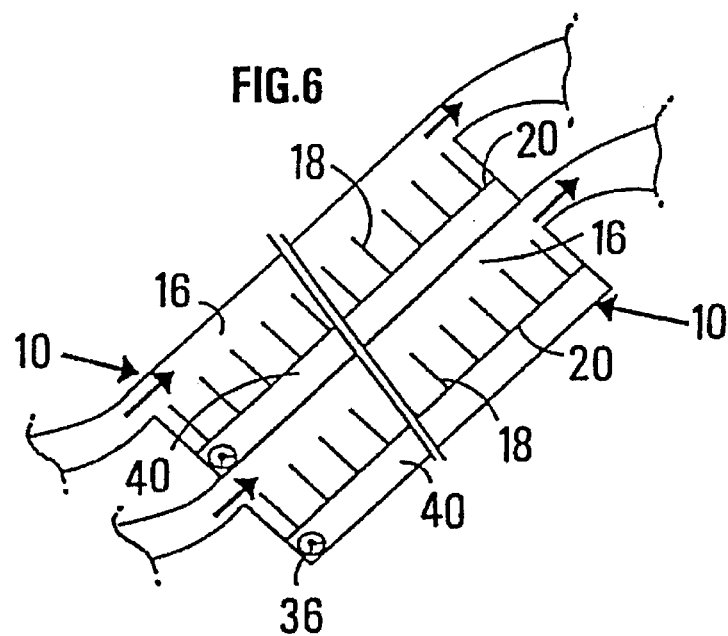
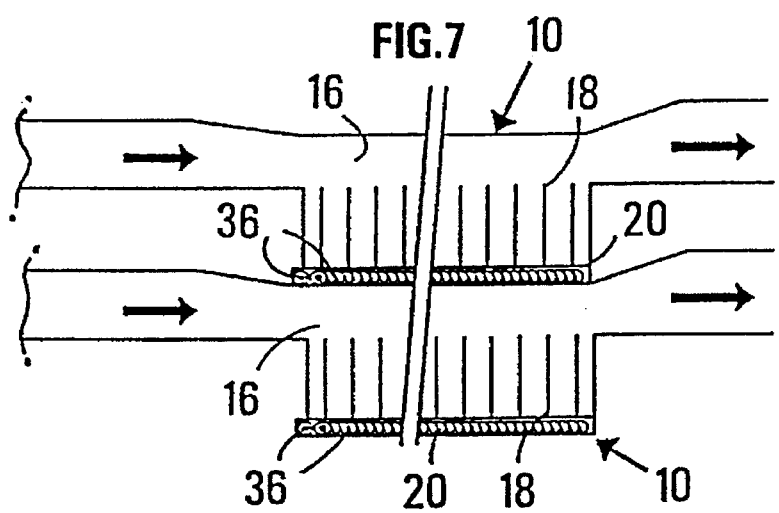
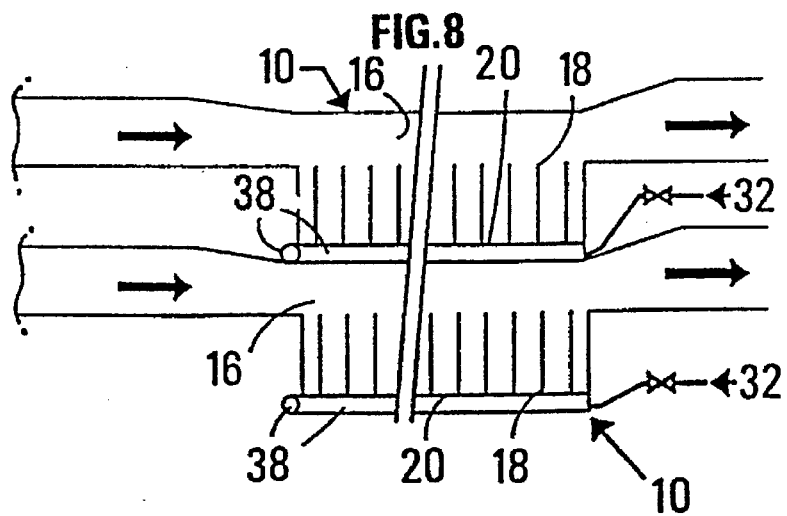

5,626,651

METHOD AND APPARATUS FOR REMOVING SUSPENDED FINE PARTICLES FROM GASES AND LIQUIDS

This application is a Continuation application of application Ser. No. 08/290,883, filed Sep. 13, 1994 now abandoned.

BACKGROUND OF THE INVENTION

The present invention is concerned with the removal of suspended very fine particles from industrial gases and liquid.

In particular, the present invention facilitates separation and collection of particulate matter, such as dust, mist, fumes, smoke, and noxious gases, etc., dispersed in a fluid, as a gas or liquid, in a state of turbulent flow, by taking advantage of certain effects associated with turbulence in a novel and particular way using purely mechanical means.

It is well known to those skilled in the an of fluid mechanics and related fields of endeavour, that fine particles dispersed in a fluid in a turbulent state of flow tend to follow the turbulent eddies and velocity fluctuations of the turbulent fluid. This is an experience shared by many non-experts who have witnessed a blizzard or a dust storm, where snow flakes or dust particles swirl around in atmospheric turbulence, carried by the wind. Thus, turbulence keeps particles suspended in the fluid well mixed.

The removal of very fine particles, typically in the size range of about 0.01 to 100 microns, from industrial gases is a difficult and expensive operation to perform efficiently. Devices traditionally employed for this purpose involve electrostatic precipitators, a variety of filters and wet scrubbers. Scrubbers are used also for the removal of noxious gases from industrial gases. Cyclone collectors have been traditionally used for the removal of particulates larger than about 5 microns and a concerted effort has been made recently to extend their scope down to about 1 micron particulate size.

At the present time, there does not exist an inexpensive industrial gas cleaning device that would efficiently collect very fine particulates either without or with simultaneous removal of noxious gases.

SUMMARY OF THE INVENTION

The present invention makes use of the mixing effects of turbulence for the separation and collection of dispersed fine particles in a novel and special way without the necessity of sticky substances or electricity.

The fluid, which may be gas or liquid, containing dispersed and suspended particles often is, in engineering applications, in a turbulent state while passing through a duct or some processing plant. Such ducts or plants are bounded by solid walls, made mostly of metal but occasionally also of other types of solid materials. As the turbulent stream passes through such ducts or processing plants, the particles suspended and dispersed in the fluid are being continuously mixed by the action of turbulence and, as a result, continually new particles are carried by the turbulence to the close proximity of the solid walls of the equipment. The essence of this invention is to capture, trap and collect the fine suspended particles as they are carried continually by the mixing action of turbulence across a defined surface and in a novel manner hereafter described.

As is well known, turbulence gradually dies out, or decays, as the walls of the equipment are approached, i.e., there is no turbulence in the immediate vicinity of the wall, in the so-called "viscous sublayer". Suspended particles of sufficient inertia are known to be carried by the mixing action of turbulence into the viscous sublayer where they can be captured, somewhat like rocks that when thrown into a quiescent shallow pond sink to the bottom. Accordingly, this invention comprises capturing, trapping and collecting the particles carried by turbulent mixing into stagnant turbulence-free zones of the fluid, gas or liquid, which do not correspond to the viscous sublayer near the solid walls, but rather are created specially for this purpose.

In this invention, stagnant, turbulence-free zones are created in the duct or in the plant by limiting the flow only to a fraction of the duct or plant while, in the rest of the duct or of the plant, the fluid cannot flow and, therefore, the turbulence gradually dies out, or decays, with increasing distance from the turbulent stream. This result can be accomplished in a very large number of different ways, all of which are considered to fall within the scope of this invention, because all of them serve the same purpose, constituting the essence of this invention.

The present invention removes fine particulates, usually air-borne dust, fog, mist or fumes, as well as noxious gases, from gas streams in a unique and efficient manner. In the present invention, the gas stream, in highly turbulent flow, is passed in a housing above a plurality of closely spaced vertical collector plates positioned perpendicular to the gas stream.

The particulates are carried by the turbulent eddies into the gaps between vertical collector plates where there is no net gas flow and where the eddies decay. The particulates are trapped and they deposit on the solid surfaces by inertial impaction and Brownian diffusion mechanisms. The deposits either fall or flow down to the bottom of said housing as they become sufficiently thick to permit such dislodgement or flow by the action of gravitational forces. The solid or the liquid is discharged from the bottom of the equipment.

For the removal of ultrafine particulates in the size range below about 0.5 micron the gaps between the vertical collector plates are loosely packed with fibers of about 0.1 micron diameter or less and thereby the solid surface area available for collection by Brownian diffusion mechanism is greatly increased.

Accordingly, in the present invention, very fine dust or mist particles, generally of particle diameter of from about 0.01 to about 100 micron are removed from gas streams and are collected in line and in a continuous manner. In addition, by injecting a fine spray or fog of atomized liquid into the gas stream upstream from the device noxious gases absorbed by the turbulent spray are also removed from the gas stream along with the fine spray or fog impinging on the vertical collector plates.

More precisely, the subject-matter of present invention is a method of removing particulates from a gas stream containing the same which comprises:
a) conveying said gas stream in highly turbulent flow through at least one flow passage situated over at least one stagnant region of gas where there is not net gas flow and which communicates with said gas stream,
b) enabling the turbulent eddies of said gas stream carrying suspended particulates to penetrate and then decay in said stagnant region where said particulates are trapped and deposited preferably by purely mechanical means on solid surfaces present,
c) dislodging the deposits of said particulates mainly by the action of gravity, d) removing said deposits continuously by means of screw conveyors, or by periodically opening louvres or other suitable means situated at the bottom of said mechanical trapping means and eventually, e) discharging said deposits into hoppers or other appropriate means.

Advantageously, the turbulence in said gas stream is enhanced by placing a grid or several grids ahead of or in the flow passages.

Moreover, upstream from said housing an atomizer can discharge into the gas stream a fine spray of a suitable liquid or slurry that scrubs suspended particulates and noxious gases from the gas stream and is subsequently precipitated on said vertical plates and is discharged from the bottom of said housing.

The subject-matter of the present application is also concerned with an apparatus for removing particulates from a gas stream containing the same wherein it comprises at least a housing having:

at least one passage for conveying the said fluid stream in highly turbulent flow, vertical collector plates which communicate with the at least one passage in order to create therein at least one stagnant region where said particulates are trapped.

As above stated, said stagnant regions are obtained by placing parallel vertical plates of from about 0.1 to about 3 mm thickness and of from about 3 to about 10 cm height and about 0.5 to about 5 cm apart from each other, underneath the flow passage, so that the bottom of said passage is formed by the upper edges of said vertical plates and the gaps present between said edges and the particulates carded by said eddies between said plates deposit on the plates surface by inertial impaction and by Brownian diffusion.

In some cases it can be advantageous that said stagnant regions between said vertical plates are packed with a suitable filter medium consisting of fibers of a diameters from about 0.01 to about 1 micron and characterized by a solids fraction of from about 0.001 to about 0.1 on the surface of which submicron particulates deposit by Brownian diffusion.

According to one embodiment of the present invention, both said vertical plates and said passage have uniform height along the entire length of said at least one passage.

In another embodiment, the heights of said vertical plates is increased gradually from the upstream end of said passage over a distance of from about 5 to about 30 cm from about 3 cm to a maximum value of about 10 cm which is maintained constant throughout the rest of the lenght of said passage resulting in an initial gradual decrease of the height of said passage from about 8 cm to a minimum value of about 1 cm which remains constant for the rest of their length.

Without departing from the scope of the invention, the top ends of said vertical plates are bent or curved in the direction opposite to said gas flow.

Said housing and said passage can have their axis either parallel or inclined of from about 20 to about 60 degrees with respect to the horizontal.

Finally, according to the invention, two or more of said housings may be arranged one above the other with a suitable distance kept between them, the deposits being then discharged from housings by screw conveyors or by pipes located between said housings.

In another embodiment, said housings are oriented with an angle with respect to the horizontal. In this case, the deposits slide or flow downwards on the outside top surface of the housings positioned underneath, the deposits discharged from said housings are oriented at an angle with respect to the horizontal and flow downwards on the outside top surface of said housings positioned underneath.

The removal efficiency η of such an apparatus can be expressed by the following relationship $$\eta = 1 - exp - Lw_{s_v}$$

where L is the passage length, S is the passage height, v is the gas velocity in the passage and w is an effective migration velocity of the dust across the plane forming the boundary between the passages and the stagnant regions. w is independent of L but it depends on the intensity of turbulence and it increases slower than in direct proportion with v and much slower than in inverse proportion with S. In addition, w is influenced by other constructional features of the equipment such as the width of a passage, the gap size between the vertical collector plates, the height of the vertical collector plates, the initial conditions of the gas entering the passages and the surface area per unit volume available for deposition of particulates. Typically, for a dust of a median particle size of about 2 microns, the values of w found have been in the range of 40 to 100 cm/s, with L in the range of 1.8 to 3.4 m, S either 2 or 3 cm, the width of the passage of about 30 cm and v in the range of 24 to 57 m/s.

BRIEF DESCRIPTION OF THE DRAWINGS

A few of embodiments of the invention are described hereinafter merely serving as examples, and certainly not to the exclusion of other possible embodiments. In the description which follows, reference is made to the accompanying drawings, in which:

FIG. 1 is a schematic diagram of a single passage turbulent precipitator in accordance with one embodiment of the invention, FIG. 2 is a side elevational view of a duct constructed in accordance with one embodiment of this invention, FIG. 3 is a side elevational view of a duct constructed in accordance with another embodiment of this invention, FIG. 4 is a side elevational view of a duct constructed in accordance with a further embodiment of the present invention.

FIG. 5 is a side elevational view of a duct constructed in accordance with another embodiment of the invention wherein an atomizer nozzle is provided upstream of the plates, FIG. 6 is a side elevational view of an embodiment having two housings inclined with respect to the horizontal, arranged one above the other, and provided with discharge channels and screw conveyors for removing accumulated particles, FIG. 7 is a side elevational view of an embodiment having two horizontal housings, one arranged above the other, including screw conveyors, and FIG. 8 is a side elevational view showing an embodiment having two horizontal housings, one arranged above the other, including discharge pipes supplied with compressed air.

DETAILED DESCRIPTION OF THE INVENTION

Referring first to FIG. 1, the turbulent precipitator comprises a housing 10, an inlet for gas laden with fine particulates and an outlet for clean gas, typically air. In this embodiment, the inlet 12 and outlet 14 are arranged on a generally horizontal axis. Inside the housing 10 the gas flows in passage 16 underneath of which there is a plurality of vertical collector plates 18. Particulates deposit on the surface of plates 18 and the deposit is subsequently removed therefrom essentially by the effect of gravity, fall to the bottom 20 whence they are collected and eventually discharged through the louvres 22 into hoppers 24. An alternative to louvres 22 may consist of a screw conveyor positioned axially at the bottom of the housing.

The entire equipment may be constructed of any convenient material, including various metals and fiberglass, and may be made to withstand wide ranges of temperatures, including very hot gases. The equipment does not require periodic cleaning if dust, fog, mist or fumes are removed in it. For removal of sticky materials such as, e.g. diesel exhaust soot, the turbulent precipitator may be used as a scrubber with the application of finely atomized diesel fuel or any other suitable liquid as the scrubbing fluid.

For the removal of noxious gases, for example for flue gas desulphurization, the turbulent precipitator may be used as a scrubber by injection of a finely atomized fog of a suitable solution or slurry, capable of absorbing the gaseous pollutant, upstream of the turbulent precipitator 10. The fog is subsequently precipitated on the vertical collector plates 18 and the solution or slurry is discharged from the bottom 20 through outlets controlled by suitable valves instead of the louvres 22. An atomizer nozzle 28 using liquid 30 and compressed air 32 for producing a fog is shown in FIG. 5.

For the removal of ultrafine submicron particles the spaces contained between the vertical collector plates 18 may be packed with ultrafine fibers 34, preferably less than about 0.1 micron diameter to a packing density of preferably less than about 0.1 volume fraction whereby the surface area per unit volume available for the deposition of ultrafine particles by Brownian motion is greatly increased. In this mode of application removal of the deposit from the fibers may require periodic cleaning. (See FIG. 2).

The turbulent motion of the gas, essential for the operation of the turbulent precipitator, may be enhanced by various means, e.g. by placing a grid 26 or several grids ahead of or in the flow passages.

The most frequent case of suspended fine particles in a fluid stream and occurring in processing or manufacturing industry is when a dusty gas flows in a duct. The flow is usually in the turbulent regime. In this case, a relatively large number of plates can be placed, one behind the other transversely located in the duct and, upstanding from the bottom of the duct, as shown schematically in FIGS. 2 and 3.

In FIG. 2, both vertical plates 18 and passage 16 have uniform height along the entire length of the passage 16. On FIG. 3, the heights of said vertical plates is increased gradually from the upstream end of said passages over a distance of from about 5 to about 30 cm from about 3 cm to a maximum value of about 10 cm which is maintained constant throughout the rest of the lenght of said passages resulting in an initial gradual decrease of the height of said passages from about 8 cm to a minimum value of about 1 cm which remains constant for the rest of their length.

Any combination of the two types of arrangements of plates shown in FIGS. 2 and 3 may be employed, including periodic repetition of the arrangement shown in FIG. 3.

For improved efficiency of dust collection and to inhibit any minor reentrainment of dust, the top edge of each plate may be bent or curved over to face the flow of the gas stream as shown in FIG. 4.

There is no net flow of gas between the individual plates, but turbulent eddies penetrate the spaces between the plates to a certain depth, carrying also the dust into the traps constituted by the plates. In the spaces between the plates, turbulence dies out rapidly with increasing distance from the surface defined by the positions of the top edges of the plates. Much of the dust carried by the eddies between the plates is not carried back by the gas into the flow channel at the top of the dust partly because the dust has reached the portion of gas stream that is stagnant and partly because the dust has been deposited by inertia on the surface of the plate on the downstream side of the gap between two plates and by Brownian motion on both surfaces of the plate. The dust builds up on the plates to a certain thickness beyond which it becomes unstable and falls to the louvred bottom of the duct from which the accumulated dust particles may be removed periodically by opening the louvres and discharging the dust into hoppers.

Without departing from the scope of the invention, the dust particles may be removed continuously by means of a screw conveyor 36 as shown, for example, in FIGS. 6 and 7.

Otherwise, the unit is not subject to clogging and may be used for long periods between removals of accumulated solids. There is no significant reentrainment of the deposited dust from the plates up to gas flow velocities on the order of 100 ms$^{-1}$. The height of the open part of the duct is on the order of magnitude of 1 cm and the separation of two adjacent plates is also of the same order, although these dimensions may be varied, dependent on the nature of the gas stream, the flow rate and the contamination loading of the gas stream.

Using these kinds of arrangement of plates in a duct, removal efficiencies of 1.5 µm mean particle diameter ASP-100 aluminum silicate pigment on the order of 99% can be attained over a duct length of approximately 5 m, with pressure losses on the order of a few inches of water column.

According to one example, removal efficiency for a gas stream containing diameter ASP 100 aluminum silicate pigment can reach a range between 80% and 86% for a duct length of 2.7 m and a passage height of 3 cm with gas velocities between 35 m/s and 24 m/s.

The collection efficiency is brought to 93% with a passage height of about 2 cm and a passage velocity of about 24 m/s.

The same principle of permitting turbulent eddies to penetrate calming regions with the purpose of arresting and collecting fine particles carried along by turbulence, may be applied to other gas cleaning equipment. For example, in another embodiment of the invention, the duct through which the particulate-laden gas stream flows may be divided into two parts, by mounting a perforated horizontal partition where gas flow is restricted to the portion of the duct above the partition, whereas in the space under the perforated partition, there is no gas flow. Turbulent eddies penetrate through the openings in the partition and die out in the quiescent zone underneath. The dust carried by the eddies through the perforations cannot return into the gas stream and settles to the bottom of the duct.

In addition, cyclone separators may be equipped with vertical fins, resembling turbine blades, the interior of the cylindrical portion of the cyclone separator, which may collect particles of under 5 micron size with high efficiency, particularly if a large number of turns is made by the gas.

As shown in FIGS. 6, 7 and 8, a plurality of individual housings may be arranged one above the other with a suitable space between them. Also, the housing 10 and the passage 16 may be arranged with their axes inclined upward at an angle of about 20° to about 60° with respect to the horizontal with respect to the horizontal as shown in FIG. 6. Also, as shown in FIG. 6, discharge channels 40 with inclined surfaces may be provided in the arrangement shown in FIG. 6 to allow the deposits to move downwardly to the screw conveyors 36. Furthermore, screw conveyors 36 or discharge pipes 38 may be located at the bottom of the respective housings as illustrated in FIGS. 7 and 8.

The principles utilized for the removal of dust from gas streams may be used to effect the removal of particulate matter, which may include dust, mist, fumes or smoke, from any fluid, whether a liquid or a gas, for example, in water filtration.

EXAMPLES OF POTENTIAL APPLICATIONS OF THE INVENTION

Type of Plants

1. Power Stations: flue gas desulphurization in all plants; pulverized fuel fired boilers; refuse burning boilers; lignite stoker fired boilers; lignite pulverized fuel fired boilers (hammer mills).

2. Coal Industry: Lignite rotary type stream dryer; lignite plate type steam dryer; combustion gas lignite dryer; lignite mill dryer; lignite conveying system de-dusting; bituminous coal tube type steam dryer; bituminous coal conveying system de-dusting; bituminous coal-coke grinding plant.

3. Coal Gas industry: peat gas producer; cracking plant for natural gas; producer gas from lignite briquettes; producer gas from semibituminous lignite: shale-gas cleaning plant; coke oven town gas cleaning; coke oven gas cleaning; oil carburetted water gas cleaning; tar carburetted water gas cleaning.

4. Paper Industry: black liquor burning plant.

5. Cement Industry: rotary kiln dry process; lepol rotary kiln dry process; rotary kiln wet process; rotary kiln with calciner, wet process; vertical kiln; raw material dryer; cement mill; packing machine.

6. Chemical Industry: pyrites roaster; pyrites roaster; pyrites roaster: pyrites roaster: acid mist from sulphur burning furnace; sulphuric acid mist following cooler tower; blonde roaster; arsenic and sulphuric acid mist removal; tail gas for sulphuric acid concentration; elemental sulphur fume from hydrogen sulphide combustion plant.

7. Mineral Earths and Salts Processing: bauxite dryer; bauxite calcining and processing kiln; alumina calciner with multicyclone procleaner: potassium chloride dryer; fuller's earth dryer.

8. Metallurgical Industry: vertical blast furnace: lead ore; rotary kiln processing: zinc ores: vertical blast furnace: tin ores; vertical blast furnace: antimony ores; copper convertors; rotary kiln for nickel bearing iron ores; ferrosilicon producers; lead production; calcium carbide producers.

9. Industries with the Following Products: abrasives; asbestor fibres; graphite; gypsum; lamp black; limestone; rubber; sand; silica flour; garbage incinerators; building materials; soap; soapstone: talc; wood flour; sandblasting; ceramic polishing; metal polishing; paint pigments; fertilizers; ore sintering; expanded pearlite; etc.

10. Food Products: flour (many types); sugars; dried dairy products; cereals; salt and spices; baking aids; instant food products; etc.

11. Air conditioning: a dust remover according to the invention can be placed in series with an air conditioner.

| Typical Particle Size Ranges for Dust or Mist Contaminants to be Removed from Industrial Gases | | |
|---|---|---|
| Source of Gas (μm) | Dust or Mist | Particle Size |
| Iron and Steel Industry | | |
| Gray iron cupola | Iron, coke, silica dust | 0.1–10 |
| Oxygen steel converter | Iron oxyde | 0.5–2 |
| Steel open-hearth furnace (scrap) | Iron and zinc oxyde | 0.08–1.00 |
| Steel open-hearth furnace (oxygen lanced) | Iron oxide | 0.02–0.50 |
| Blast furnace (iron) | Iron ore and coke dust | 0.5–20 |
| Electric furnace | Ferro-manganese fume | 0.1–1 |
| Electric furnace | Ferro silicon dust | 0.1–1 |
| Rotary kiln - iron reduction | Iron, carbon | 0.5–50 |
| Crushing and screening | Taconite iron ore dust | 0.5–100 |
| Chemical Industry | | |
| Acid - humidified $SO_3$ (a) scrub with water (b) scrub with 40% acid | Sulphuric acid mist | — |
| Acid concentrator | Sulphuric acid mist | — |
| Copperas roasting kiln | Sulphuric acid mist | — |
| Chlorosulfonic acid plant | Sulphuric acid mist | — |
| Phosphoric acid plant | Orthophosphoric acid mist | — |
| Dry ice plant | Amine fog | — |
| Wood distillation plant | Tar and acetic acid | — |
| Titanium chloride plant, titanium dioxide dryer | Titanium dioxide, hydrogen chloride fume | 0.5–1 |
| Spray dryers | Detergents, fume and odor | — |
| Flash dryer | Furfural dust | 0.1–1 |
| Non-ferrous Metals Industry | | |
| Blast furnace (sec. lead) | Lead compounds | 0.1–1 |
| Reverberatory lead furnace | Lean and tin compounds | 0.1–0.85 |
| Ajax furnace - magnesium alloy | Aluminium chloride | 0.1–0.9 |
| Zinc sintering | Zinc and lead oxide dusts | 0.1–1 |
| Reverberatory brass furnace | Zinc oxide fume | 0.05–0.5 |
| Mineral Products Industry | | |
| Lime kiln | Lime dust | 1–50 |
| Lime kiln | Soda fume | 0.3–1 |
| Asphalt stone dryer | Limestone and rock dust | 1–50 |
| Cement kiln | Cement dust | 0.5–55 |
| Petroleum Industry | | |
| Catalytic reformer | Catalyst dust | 0.5–50 |
| Acid concentrator | Sulphuric acid mist | — |
| TCC catalyst regenerator | Oil fumes | — |
| Fertilizer Industry | | |
| Fertilizer dryer | Ammonium chloride fumes | 0.05–1 |
| Superphosphate den and mixer | Fluorine compounds | — |
| Pulp and Paper Industry | | |
| Lime kiln | Lime dust | 0.1–50 |
| Lime kiln | Soda fume | 0.1–2 |
| Black liquor recovery boiler | Salt cake | — |
| Miscellaneous | | |
| Pickling tanks | Hydrogen chloride fumes | — |
| Boiler flue gas | Fly ash | 0.1–3 |
| Sodium disposal incinerator | Sodium oxide fumes | 0.1–0.3 |

In summary of this disclosure, the present invention provides a novel and inexpensive manner of removal of fine particulate dust, fog, mist or fumes and noxious gases from gas streams in a continuous in-line procedure involving transport of the particulates by turbulent eddies into spaces where the gas is quiescent and subsequent deposition of the particulates in those spaces on solid surfaces present, coupled with absorption by an atomized liquid spray or fog of noxious gases. Modifications are possible within the scope of this invention.

What we claim is:

1. A method for removing particulates from a gas stream containing the particulates, which comprises:

(a) passing said gas stream, with turbulent flow, through a flow passage in a given direction in a housing over a plurality of stagnant, turbulent-free regions of gas in which there is no net gas flow and which communicate with said gas stream; and (b) arranging a plurality of surfaces transversely to the direction of flow of the gas stream, said surfaces extending away from the gas stream and being spaced closely together to define the turbulent-free regions, said regions each communicating with the gas passage at one end and being closed at another end, with each region occupying substantially all of the space between adjacent surfaces so that turbulent eddies of said gas stream carrying suspended particulates enter spaces between the surfaces and then decay in said plurality of stagnant, turbulent-free regions and said particulates are trapped and deposited mechanically on the surfaces defining each of said stagnant, turbulent-free regions.

2. The method of claim 1, wherein turbulence in said gas stream is enhanced by placing at least one grid ahead of the flow passage arranged over the plurality of stagnant, turbulent-free regions.

3. The method of claim 1, further comprising positioning an atomizer upstream from the housing containing said flow passage, said atomizer discharging into the gas stream a fine spray of liquid that scrubs suspended particulates and noxious gases from the gas stream and that subsequently precipitates on said surfaces, said liquid being transferred from the closed ends of said regions, together with the deposits of said particulates.

4. The method according to claim 1, wherein said stagnant, turbulent-free regions are provided by arranging a plurality of parallel vertical collector plates subjacent to said flow passage, said plates being spaced apart from each other by a distance of about 0.5 to about 5 cm and being arranged below the flow passage so that a lower portion of the flow passage is formed by upper edges of said vertical plates and spaces present between said edges, the particulates being carried by the turbulent eddies within said gas stream into the spaces between said plates and being deposited on said surfaces of the plates by inertial impaction and by Brownian diffusion.

5. The method of claim 1, wherein said particulates have diameters of from about 0.01 to 100 microns, the gas stream has a velocity of from about 10 to about 50 m/s and said flow passage has a height of about 1 to about 8 cm and a width of about 5 to 30 cm.

6. An apparatus for removing particulates from a gas stream containing the particulates which comprises a housing having an inlet and an outlet, a flow passage for conveying said gas stream in a turbulent flow in a direction from said inlet to said outlet, parallel collector plates which are arranged subjacent and transversely to said flow passage, said plates forming spaces therebetween, said spaces each communicating at one end with the flow passage in order to create thereunder a plurality of stagnant, turbulent-free gas regions extending away from the flow passage between said plates wherein said particulates are trapped and are deposited on surfaces of said plates; said collector plates being closely spaced together so that the spaces formed therebetween allow turbulent eddies of said gas stream to enter only into upper portions of the spaces formed between said plates and cause the eddies to decay in the stagnant, turbulent-free regions occupying substantially all of the remaining portions of said spaces, said spaces each being closed at the other end.

7. The apparatus of claim 6, wherein said collector plates each are spaced from each other by a distance of about 0.5 to about 5 cm, upper edges of said collector plates and spaces present between said edges defining a lower portion of said flow passage and the particulates being deposited on surfaces of the plates by inertial impaction and by Brownian diffusion.

8. The apparatus of claim 6, further comprising a filter medium located within said stagnant regions between said collector plates, said filter medium consisting of fibers of a diameter from about 0.01 to about 1 micron and having a solid fraction of from about 0.001 to about 0.1 on the surface of which submicron particulates deposit by Brownian diffusion.

9. The apparatus of claim 6, wherein said collector plates and said flow passage have uniform heights along an entire length of said flow passage.

10. The apparatus of claim 6, wherein heights of said collector plates are increased gradually from an upstream end of said passage over a distance substantially more than one half an entire length of the flow passage and thereafter heights of said vertical plates are maintained constant throughout a remaining portion of a length of said passage.

11. The apparatus of claim 6, wherein top ends of said collector plates are bent or curved in a direction opposite to the direction of said gas flow.

12. The apparatus of claim 6, wherein said housing and said passage each have a longitudinal axis, said axes of the housing and the passage being arranged parallel to a horizontal plane.

13. The apparatus of claim 6, wherein said housing and said passage each have an axis which is inclined upward at an angle of from about 20° to about 60° with respect to a horizontal plane.

14. The apparatus of claim 13, wherein deposits of said particulates move downwardly on an upper surface of the housing to be removed by screw conveyors or discharge pipes.

15. The apparatus of claim 6, further comprising means for removing accumulated deposits of the particulates from bottoms of the stagnant regions.

16. The apparatus of claim 6, further comprising at least one other housing having the same construction as the housing having an inlet and an outlet, a flow passage and parallel collector plates; said housings being arranged one above the other with a suitable distance being provided between each of the housings and means for removing deposits discharged from the housings arranged between the housings and at a bottom of a lowermost housing.

17. The apparatus of claim 6, wherein said collector plates are vertically arranged in said housing.

* * * * *